United States Patent
Kobayashi et al.

(10) Patent No.: US 9,098,372 B2
(45) Date of Patent: Aug. 4, 2015

(54) INFORMATION PROCESSING APPARATUS

(75) Inventors: Motoki Kobayashi, Tokyo (JP); Yasutaka Miwa, Tokyo (JP)

(73) Assignees: Sony Corporation, Tokyo (JP); Sony Computer Entertainment Inc., Tokyo (JP)

(*) Notice: Subject to any disclaimer, the term of this patent is extended or adjusted under 35 U.S.C. 154(b) by 479 days.

(21) Appl. No.: 13/347,246

(22) Filed: Jan. 10, 2012

(65) Prior Publication Data

US 2012/0192170 A1 Jul. 26, 2012

(30) Foreign Application Priority Data

Jan. 24, 2011 (JP) .................................. 2011-012119

(51) Int. Cl.
G06F 9/44 (2006.01)
G06F 9/445 (2006.01)

(52) U.S. Cl.
CPC .. G06F 8/65 (2013.01); G06F 8/34 (2013.01); G06F 8/60 (2013.01)

(58) Field of Classification Search
None
See application file for complete search history.

(56) References Cited

U.S. PATENT DOCUMENTS

| | | | |
|---|---|---|---|
| 8,113,951 B2* | 2/2012 | David et al. ...................... | 463/30 |
| 2008/0141018 A1 | 6/2008 | Tanaka et al. | |
| 2010/0107150 A1* | 4/2010 | Kamada et al. ................ | 717/170 |
| 2011/0283256 A1* | 11/2011 | Raundahl Gregersen et al. ............................. | 717/108 |
| 2012/0180034 A1* | 7/2012 | Hatamoto et al. ............ | 717/168 |

FOREIGN PATENT DOCUMENTS

| | | |
|---|---|---|
| JP | 2000276335 A | 10/2000 |
| JP | 2010191786 A | 9/2010 |
| JP | 2010258908 A | 11/2010 |
| JP | 2010283800 A | 12/2010 |
| WO | 2007091310 A | 8/2007 |
| WO | 2008114491 A | 9/2008 |

OTHER PUBLICATIONS

Heartful Online RPG Emil Chronicle Online Player's Guide, Kabushiki, Kaisha Futabasha, 1st. edition, pp. 2-4/E, Feb. 20, 2006 (for relevancy, see Japanese Office Action for JP Patent Application No. 2011012119 dated Jan. 22, 2013, p. 1, Paragraph 1).

Aodamatei, aoUpdater Operation Guide, (URL:http://aodamatei.sakura.ne.jp/aoupdater/aoUpdater_ manual_ 220. pdf) Dec. 18, 2012. (for relevancy, see Japanese Office Action for JP Patent Application No. 2011012119 dated Jan. 22, 2013, p. 2, last paragraph).

(Continued)

*Primary Examiner* — Don Wong
*Assistant Examiner* — Deric Ortiz
(74) *Attorney, Agent, or Firm* — Matthew B. Dernier, Esq.

(57) ABSTRACT

An information processing apparatus displays, on a screen of a display device, a program-related image which relates to an application program in a state in which the application program is not executed, starts execution of the application program in a case where an operation of giving an instruction to execute the application program is received from a user in a state in which the program-related image is displayed on the screen, and applies update data to the application program to update the application program in a case where an operation of giving an instruction to apply the update data is received from the user in the state in which the program-related image is displayed on the screen.

6 Claims, 6 Drawing Sheets

(56) References Cited

OTHER PUBLICATIONS

Office Action for corresponding Japanese Patent Application No. 2011012119, dated Jan. 22, 2013.
Office Action for corresponding Japaenese Patent Application No. 2013-188822, dated Aug. 19, 2014.
Toshiba Corporation, How to Check for Software Update using "Toshiba Service Station," 7 pages, [online], Oct. 24, 2010, [searched on Aug. 11, 2014, URL:http://dynabook.com/assistpc/mid/faq/pcdata/710028.htm>.
KDDI Corporation, iida X-RAY Instruction Manual Detailed Version, [online], Oct. 2010, 1st edition, 5 Pages [searched on Aug. 11, 2014], Internet <URL:http://media.kddi.com/app/publish/torisetsu/pdf/xray_torisetsu_shousai.pdf.

* cited by examiner

INFORMATION PROCESSING APPARATUS

CROSS-REFERENCE TO RELATED APPLICATION

The present application claims priority from Japanese application JP 2011-012119 filed on Jan. 24, 2011, the content of which is hereby incorporated by reference into this application.

BACKGROUND OF THE INVENTION

1. Field of the Invention

The present invention relates to an information processing apparatus for applying update data to an application program to update the application program, an information processing method, and an information storage medium.

2. Description of the Related Art

In an information processing apparatus for executing an application program, such as a personal computer or a game machine, update data (such as patch) for updating contents of an application program is provided from an external server or the like in some cases (see, for example, US 2008/0141018 A1). The information processing apparatus acquires the update data by downloading the update data via a communication network or other such method and applies the update data to the application program stored in the information processing apparatus, to thereby allow a user to use the application program updated to the latest contents.

If such update of the application program is to be executed at the time of activating the application program, for example, in a case where the user desires to execute the application program immediately, the information processing apparatus has to keep the user waiting while confirming whether or not the update data exists and applying the update data. Further, if the information processing apparatus confirms whether or not the update data exists while the application program is being executed, in a case where the update data exists, the application program generally has to be restarted in order to apply the update data.

SUMMARY OF THE INVENTION

The present invention has been made in view of the above-mentioned circumstances, and has an object to provide an information processing apparatus capable of updating an application program at an arbitrary timing specified by a user, an information processing method, and an information storage medium.

An information processing apparatus according to the present invention includes: program-related image display control section displays, on a screen of a display device, a program-related image which relates to an application program, in a state in which the application program is not executed; program execution section starts execution of the application program in a case where an execution instruction operation of giving an instruction to execute the application program is received from a user in a state in which the program-related image is displayed on the screen; and program update section applies update data to the application program to update the application program in a case where an update instruction operation of giving an instruction to apply the update data is received from the user in the state in which the program-related image is displayed on the screen.

In the above-mentioned information processing apparatus, the program-related image may include an execution instruction image to be subjected to the execution instruction operation and an update instruction image to be subjected to the update instruction operation, the execution instruction operation may include a user's operation of selecting the execution instruction image, and the update instruction operation may include a user's operation of selecting the update instruction image.

Further, the program update section may acquire the update data in a case where the operation of selecting the update instruction image, is received in a state in which the update data has not been acquired yet, and apply, in a case where the operation of selecting the update instruction image, is received in a state in which the update data has already been acquired, the update data which has already been acquired, and the update instruction image may be changed depending on whether or not the update data has been acquired.

Further, in the above-mentioned information processing apparatus, the program-related image display control section may display the program-related image on the screen both in a state before the execution of the application program is started, and in a state in which the execution of the application program is suspended, the program execution section may restart the execution of the application program which is suspended in a case where the execution instruction operation is received in a state in which the execution of the application program is suspended and the program-related image is displayed on the screen, and the program update section may apply, in a case where the update instruction operation is received in the state in which the execution of the application program is suspended and the program-related image is displayed on the screen, the update data after terminating the execution of the application program which is suspended.

Further, the program update section may be configured to: output, in the case where the update instruction operation is received in the state in which the execution of the application program is suspended and, at the same time, the program-related image is displayed on the screen, a message for confirming whether or not to terminate the execution of the application program; and after the message is output, in a case where the user performs an operation of giving an instruction to terminate the execution of the application program, apply the update data after terminating the execution of the application program, and in a case where the user performs an operation of giving an instruction not to terminate the execution of the application program, stop applying the update data.

Also, an information processing method according to the present invention includes: displaying, on a screen of a display device, a program-related image which relates to an application program, in a state in which the application program is not executed; starting execution of the application program in a case where an execution instruction operation of giving an instruction to execute the application program is received from a user in a state in which the program-related image is displayed on the screen; and applying update data to the application program to update the application program in a case where an update instruction operation of giving an instruction to apply the update data is received from the user in the state in which the program-related image is displayed on the screen.

Also, a non-transitory computer-readable information storage medium according to the present invention stores a program including instructions that cause a computer to: display, on a screen of a display device, a program-related image which relates to an application program, in a state in which the application program is not executed; start execution of the application program in a case where an execution instruction operation of giving an instruction to execute the application program is received from a user in a state in which the program-related image is displayed on the screen; and apply update data to the application program to update the application program in a case where an update instruction operation of giving an instruction to apply the update data is received from the user in the state in which the program-related image is displayed on the screen.

DETAILED DESCRIPTION OF THE INVENTION

Hereinafter, an embodiment of the present invention is described in detail with reference to the accompanying drawings.

Figure 1:
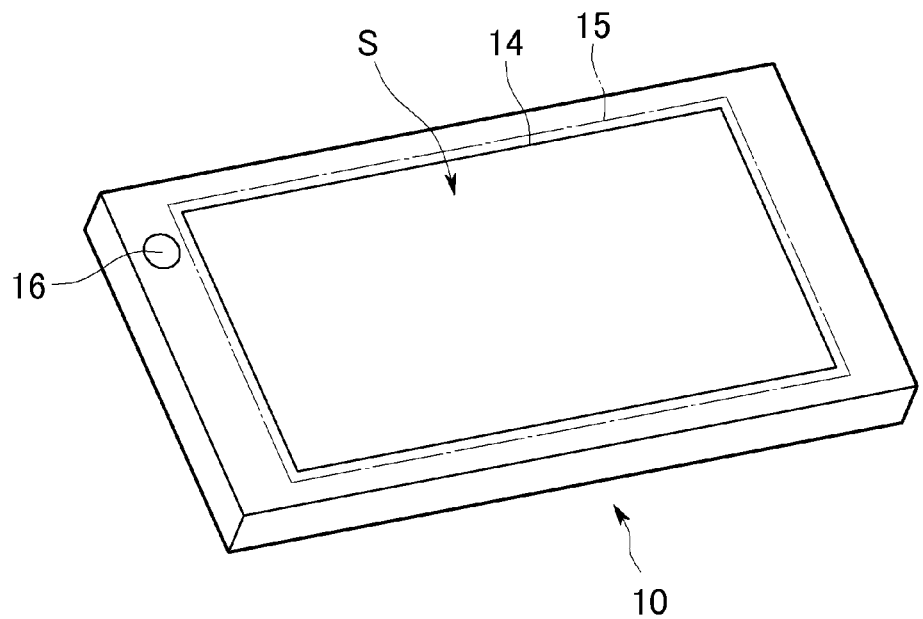
FIG. 1 is a perspective view illustrating an example of an appearance of an information processing apparatus according to an embodiment of the present invention.
Figure 2:
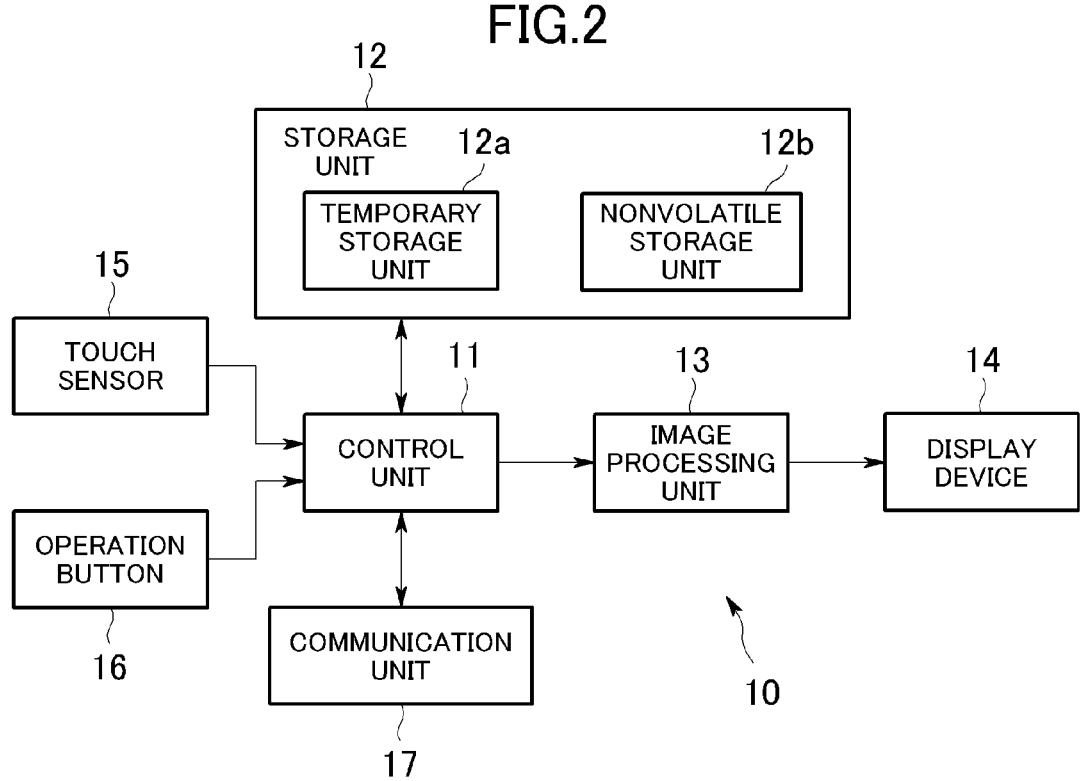
FIG. 2 is a configuration block diagram illustrating a configuration of the information processing apparatus according to the embodiment of the present invention.

FIG. 1 is a perspective view illustrating an example of an appearance of an information processing apparatus 10 according to an embodiment of the present invention. Further, FIG. 2 is a configuration block diagram illustrating a configuration of the information processing apparatus 10. As illustrated in the figures, the information processing apparatus 10 includes a control unit 11, a storage unit 12, an image processing unit 13, a display device 14, a touch sensor 15, an operation button 16, and a communication unit 17.

The control unit 11 is a CPU or the like and executes various kinds of information processing in accordance with programs stored in the storage unit 12. A specific example of processing executed by the control unit 11 in this embodiment is described later.

The storage unit 12 includes a temporary storage unit 12a and a nonvolatile storage unit 12b, and stores a program to be executed by the control unit 11 and various kinds of data. Specifically, the temporary storage unit 12a includes a memory device such as a random access memory (RAM), and temporarily stores a program being executed by the control unit 11, data used by the program, and the like. Further, the temporary storage unit 12a functions as a work memory of the control unit 11. The nonvolatile storage unit 12b includes, for example, a nonvolatile memory device such as a flash memory and/or a hard disk drive, and stores the program and various kinds of data to be read into the temporary storage unit 12a. Note that, the data stored in the temporary storage unit 12a is erased by turning off the power supply of the information processing apparatus 10, but the data stored in the nonvolatile storage unit 12b is retained even after turning off the power supply of the information processing apparatus 10 and can be reused.

In particular, in this embodiment, the information processing apparatus 10 is to execute an application program AP such as a game application, and when the control unit 11 executes the application program AP, the application program AP is read from the nonvolatile storage unit 12b into the temporary storage unit 12a.

The image processing unit 13 includes, for example, a graphics processing unit (GPU) and a frame buffer memory, and renders an image to be displayed on a screen S of the display device 14 in accordance with a rendering instruction output by the control unit 11. As a specific example, the image processing unit 13 includes a frame buffer memory corresponding to the screen S, and the GPU writes the image to the frame buffer memory every predetermined time in accordance with the instruction from the control unit 11. Then, the image written to the frame buffer memory is converted into a video signal at a predetermined timing, and output to the display device 14.

The display device 14 includes the screen S, and displays the image rendered by the image processing unit 13 on the screen S. Note that, the display device 14 may be various kinds of devices for displaying an image, such as a liquid crystal display panel and an organic electroluminescence (EL) display panel. Further, in this embodiment, the display device 14 is included in the casing of the information processing apparatus 10, but the display device 14 may be a device that is independent from the information processing apparatus 10.

The touch sensor 15 includes a substantially rectangular detection surface having a shape and size corresponding to the screen S of the display device 14 and detects, when an object contacts on the detection surface, the contact position of the object. The detection surface of the touch sensor 15 is provided so as to overlap the screen S. Therefore, when a user performs an operation of, for example, bringing an object such as his/her finger or a stylus held in hand into contact with the screen S, the touch sensor 15 can detect this operation. Note that, in the following, for convenience of description, it is assumed that an object to be detected by the touch sensor 15 is the user's finger, and the user inputs an operation by bringing his/her finger into contact with the touch sensor 15. Further, it is not necessary that the touch sensor 15 detect the position of the object only when the object contacts the detection surface, but the touch sensor 15 may detect the position of the object with respect to the detection surface when the object approaches to a detectable range on the detection surface. The touch sensor 15 may be of any type, as long as it is a device capable of detecting the position of the object on the detection surface, for example, of a capacitive type, a pressure type, an optical type, or the like.

The operation button 16 is a type of operation members used by the user in conjunction with the touch sensor 15 to input an operation to the information processing apparatus 10. The user pushes the operation button 16 to input the operation to the information processing apparatus 10. Note that, in FIG. 1, only one operation button 16 is illustrated, but the information processing apparatus 10 may include a plurality of operation buttons. The information processing apparatus 10 may further include a switch, an analog stick, or other such operation member.

The communication unit 17 is an interface for transmitting/receiving information to/from other communication devices via a communication network such as the Internet, a local area network (LAN), or a wireless LAN. The information processing apparatus 10 transmits/receives information to/from other information processing apparatuses via the communication unit 17.

Next, the application programs AP to be executed by the information processing apparatus 10 are described. Note that, in the following, an application program AP is a program that can be selected by the user in a state in which a menu image Im to be described later is displayed. The information processing apparatus 10 may execute various programs in addition to the application programs AP.

In this embodiment, the application programs AP are classified into two types: full mode programs AP1 that are operated only in a full mode; and light programs AP2 that may be operated in a menu mode different from the full mode. The information processing apparatus 10 according to this embodiment operates in any one of a plurality of operation modes including at least the full mode and the menu mode. The full mode is an operation mode in which one program (full mode program AP1) solely occupies the entire screen S for operation, and the contents of an operation of the user detected by the touch sensor 15 while the information processing apparatus 10 operates in the full mode are treated as an input to the full mode program AP1 that is being executed. The full mode program AP1 is executed only in the full mode, and a program output image indicating its processing result is displayed over the entire screen S. Note that, only one full mode program AP1 can be executed at the same time because of its nature of occupying the entire screen S at the time of being executed, and hence when the processing of another full mode program AP1 is to be executed or the information processing apparatus 10 is to shift to the menu mode, the processing of the full mode program AP1 that is being executed needs to be terminated or suspended temporarily. On the other hand, the menu mode is an operation mode in which a menu image display control section 21 to be described later displays the menu image Im or a program-related image Ip within a predetermined region of the screen S, and the light program AP2 displays a program output image indicating its processing result in a partial region of the screen S as the program-related image Ip. Further, in the menu mode, the program-related images Ip respectively relating to a plurality of application programs AP can be switched for display, and hence it is possible to execute a plurality of light programs AP2 at the same time.

Figure 3:
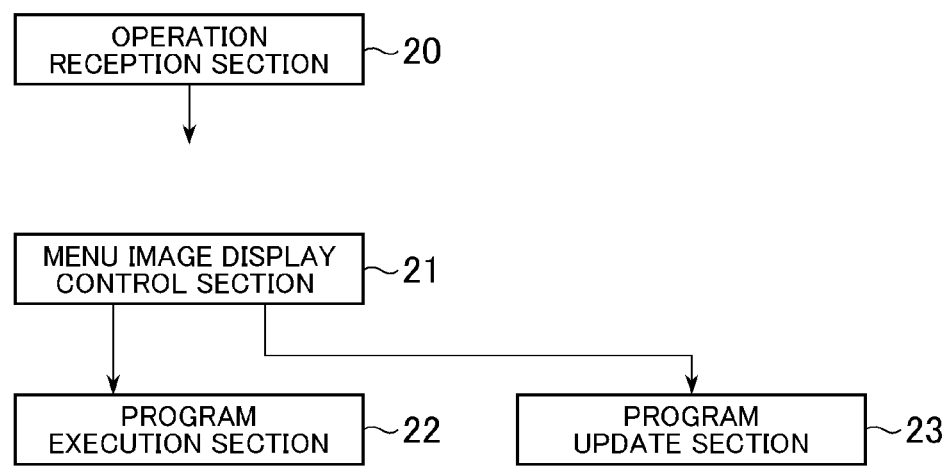
FIG. 3 is a function block diagram illustrating functions realized by the information processing apparatus according to the embodiment of the present invention.

Next, functions realized by the information processing apparatus 10 according to this embodiment are described. FIG. 3 is a function block diagram illustrating the functions realized by the information processing apparatus 10. As illustrated in the figure, the information processing apparatus 10 functionally includes an operation reception section 20, a menu image display control section 21, a program execution section 22, and a program update section 23. These functions are each realized by executing a program stored in the storage unit 12 by the control unit 11. The program may be, for example, stored in various types of computer-readable information storage media such as an optical disc to be provided to the information processing apparatus 10. Alternatively, the program may be provided to the information processing apparatus 10 through a communication network such as the Internet.

The operation reception section 20 receives the instruction operation performed by the user on the touch sensor 15 or the operation button 16. Especially in this embodiment, for example, the user brings his/her finger on the detection surface of the touch sensor 15 or slides the finger in a state in which the finger is in contact with the detection surface, to thereby input the operation to the information processing apparatus 10. In the following, an operation in which the user brings his/her finger in contact with one point on the detection surface for a short period of time is referred to as a tap operation. When the tap operation is performed, the operation reception section 20 outputs a position of the tap operation (that is, the position in the detection surface with which the user brings his/her finger into contact). Further, an operation in which the user brings his/her finger into contact with one point on the detection surface and moves the finger linearly with the position as a start point in any direction on the detection surface before releasing the finger is referred to as a slide operation. When the slide operation is performed, the information processing apparatus 10 performs various kinds of information processing in accordance with the direction in which the user moved the finger in the operation. In other words, the slide operation is an operation in which the user specifies a direction on the information processing apparatus 10. When the slide operation is performed in the state in which the menu image Im or the program-related image Ip to be described later is displayed, the operation reception section 20 determines the direction specified by the user from the positions of the start point and the end point. In this case, the determined direction may be, for example, any one of four directions in the screen S: up; down; left; and right. The function sections to be described below execute various types of information processing in accordance with the details of the tap operation and the slide operation received by the operation reception section 20.

The menu image display control section 21 displays the menu image Im on the screen S at a predetermined timing, for example, at the time of activation of the information processing apparatus 10, or at the time when the user gives an instruction to display a menu. The menu image Im is an image to be presented to prompt the user to select one of the application programs AP to be executed, and is an image including a plurality of menu item images Ic as targets for selection by the user. Each of the plurality of menu item images Ic is associated with any one of the plurality of application programs AP. Each of the menu item images Ic may be an icon image or the like representing the corresponding application program AP.

Figure 4:
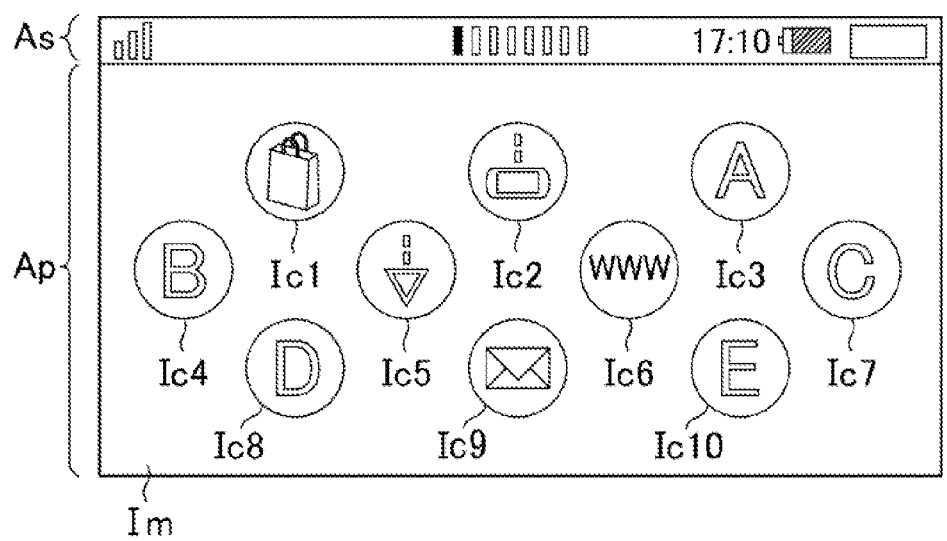
FIG. 4 is a diagram illustrating an example of a screen displaying a menu image.

FIG. 4 is a diagram illustrating an example of the screen S displaying the menu image Im. In this figure, the menu image Im includes 10 menu item images Ic1 to Ic10 respectively associated with the application programs AP. Further, in the example of FIG. 4, a thin rectangular status bar display region As is provided along the upper side of the screen S, and the status bar display region As displays a status bar. The status bar may include various kinds of information indicating states of the information processing apparatus 10 such as, for example, the remaining battery and the communication connectivity, the current time, and the like. Further, a region in the screen S that displays the menu image Im is referred to as a program display region Ap. In the example of FIG. 4, the program display region Ap is illustrated as a region of the screen S other than the status bar display region As. However, in a case where the status bar does not need to be displayed at all times, the program display region Ap may be the entire screen S. Note that, it is assumed that the above-mentioned menu mode is a state in which the menu image display control section 21 displays the status bar in the status bar display region As, and at the same time, displays the menu image Im or the program-related image Ip (image relating to any one of the plurality of application programs AP) in the program display region Ap.

In a state in which the menu image Im is displayed, the user taps a position at which any one of the menu item images Ic is displayed to perform a selection operation on the menu. In other words, the user selects any one of the menu item images Ic to give an instruction to display a program-related image Ip relating to the application program AP associated with the selected menu item image Ic. However, in this embodiment, when the user selects the menu item image Ic, the application program AP corresponding to the selected menu item image Ic is not necessarily activated immediately. Specifically, when the user selects the full mode program AP1, the menu image display control section 21 only displays the program-related image Ip corresponding to the selected full mode program AP1 in the program display region Ap, and does not activate the full mode program AP1 at this time point. On the other hand, when the user selects the light program AP2, the menu image display control section 21 gives an instruction to activate the light program AP2 to the program execution section 22, and displays an image output by the light program AP2 in the program display region Ap as the program-related image Ip corresponding to the light program AP2.

The program-related image Ip is an image which relates to the corresponding application program AP, and is displayed in the program display region Ap of the screen S. Note that, the program-related image Ip includes a unique image that is prepared for each application program AP, and is an image that is different for each application program AP. Specifically, the program-related image Ip corresponding to the full mode program AP1 includes an execution instruction image to be subjected to an execution instruction operation of starting the execution of the full mode program AP1. In this embodiment, it is assumed that the execution instruction image is an activation button image IL representing an activation button. Note that, the program-related image Ip corresponding to the full mode program AP1 is displayed before the full mode program AP1 is activated, and hence is not obviously an image rendered by the full mode program AP1 itself but an image rendered by a program other than the full mode program AP1 (here, program that realizes the menu image display control section 21).

Further, the program-related image Ip corresponding to the full mode program AP1 includes, in addition to the activation button image IL, an update instruction image Iu to be subjected to an update instruction operation of applying update data UD to the full mode program AP1. The update instruction image Iu may be arranged at the same position in each of the plurality of program-related images Ip corresponding to the plurality of full mode programs AP1. Further, the update instruction image Iu may be the same image in each of the plurality of program-related images Ip.

Figure 5:
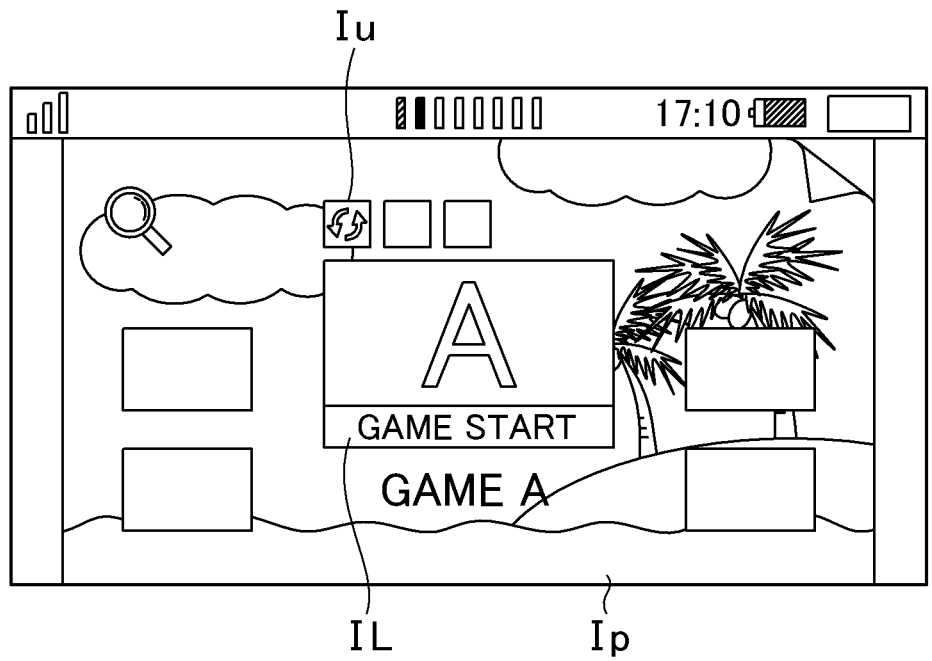
FIG. 5 is a diagram illustrating an example of a screen displaying a program-related image.

FIG. 5 is a diagram illustrating an example of a screen displaying the program-related image Ip corresponding to the full mode program AP1. In the example of FIG. 5, the activation button image IL to be subjected to an instruction operation of starting the execution of the corresponding full mode program AP1 is arranged at the center of the program-related image Ip. Further, above the activation button image IL, icon images to be subjected to various kinds of instruction operations for the corresponding full mode program AP1 are arranged side by side, and one of the icon images is the update instruction image Iu. Further, around the activation button image IL, various kinds of related information which relate to the full mode program AP1 and are prepared by the provider of the full mode program AP1 may be displayed.

Meanwhile, the program-related image Ip corresponding to the light program AP2 may be the program output image indicating the processing result of the light program AP2 without change. In this case, unlike in the case of the full mode program AP1, the program-related image Ip corresponding to the light program AP2 is rendered by the light program AP2 itself. Note that, the program-related image Ip corresponding to the light program AP2 may also include the update instruction image Iu to be subjected to an instruction operation of applying the update data UD to the light program AP2.

Further, the menu image display control section 21 switches, in response to a user's instruction, an image displayed in the program display region Ap between the menu image Im and the program-related image Ip. Further, in response to the user's instruction, the menu image display control section 21 may switch for display a plurality of program-related images Ip which have been displayed as a result of the user's sequential selection of a plurality of menu item images Ic. With this, though the menu image display control section 21 displays only one program-related image Ip at the same time, while the information processing apparatus 10 operates in the menu mode, the user can arbitrarily switch among the plurality of program-related images Ip which have been displayed up to now to display the program-related images Ip in the program display region Ap.

The program execution section 22 is realized by the control unit 11 executing the application program AP. In this embodiment, in a case where the user performs an operation of selecting the light program AP2 in a state in which the menu image Im is displayed, or in a case where the user performs an operation of giving an instruction to start the execution of the full mode program AP1 (here, operation of tapping the activation button image IL) in a state in which the program-related image Ip corresponding to the full mode program AP1 is displayed, the program execution section 22 starts the execution of the program subjected to the operation performed by the user. Specifically, the program execution section 22 reads at least a part of the application program AP to be executed into the temporary storage unit 12a, and starts the execution of a processing command described in the program.

In particular, in a case where the program execution section 22 executes the full mode program AP1, the program execution section 22 switches the operation mode of the information processing apparatus 10 to the full mode, and executes the full mode program AP1 in the full mode. At this time, as described above, the program output image indicating the processing result of the full mode program AP1 is displayed on the entire screen S, and operation inputs of the user to the touch sensor 15 are all processed as an input to the full mode program AP1 that is being executed.

Further, in this embodiment, in a case where the user pushes the operation button 16 while the full mode program AP1 is being executed, the program execution section 22 suspends the execution of the processing of the full mode program AP1, and switches the operation mode of the information processing apparatus 10 from the full mode to the menu mode. With this, the menu image display control section 21 displays again, in the program display region Ap, the program-related image Ip that was displayed before the full mode program AP1 is activated. In other words, the program-related image Ip corresponding to the full mode program AP1 is displayed not only in a state before the execution of the full mode program AP1 is started but also in a state in which the execution thereof is suspended after the start of the execution. However, the information processing apparatus 10 operates in the full mode while the full mode program AP1 is executed, and hence the program-related image Ip is displayed in a state in which the full mode program AP1 is not executed in any case.

Here, the state in which the execution of the full mode program AP1 is suspended (hereinafter, referred to as execution-suspended state) is described. In this state, unlike in a state in which the execution of the full mode program AP1 is completely terminated, at least a part of data relating to the full mode program. AP1 that is stored in the temporary storage unit 12a when the execution of the full mode program AP1 is suspended (hereinafter, referred to as data at suspension) is retained in the storage unit 12 without being erased. Specifically, the data at suspension includes contents of the full mode program AP1 that have been read into the temporary storage unit 12a and are being executed, temporary data generated along with the execution of the full mode program AP1, and the like. Those pieces of data that are temporarily retained may be retained in the temporary storage unit 12a as they are without being erased from the temporary storage unit 12a. Alternatively, those pieces of data may be temporarily saved in the nonvolatile storage unit 12b. Further, in the execution-suspended state, in addition to the data at suspension, contents of a register and program counter which are recorded along with the execution processing of the full mode program AP1 performed by the control unit 11 may also be saved and retained in the temporary storage unit 12a or the nonvolatile storage unit 12b. In a case where the user gives an instruction to restart the execution of the full mode program AP1 that is in the execution-suspended state, the program execution section 22 uses the data at suspension retained in the temporary storage unit 12a or the nonvolatile storage unit 12b to restart the execution from the state in which the processing of the full mode program AP1 is suspended. It is assumed that the instruction to restart the execution is given to the activation button image IL as in the case of the instruction to start the execution. Specifically, when the user desires to restart the execution of the full mode program AP1 that is in the execution-suspended state, the user performs an operation of switching the image displayed in the program display region Ap to the program-related image Ip corresponding to the full mode program AP1 and tapping the activation button image IL. In a case where an instruction operation is performed on the activation button image IL in the state before the execution of the full mode program AP1 is started, the program execution section 22 activates the full mode program AP1. Further, in a case where the instruction operation is performed on the activation button image IL in the execution-suspended state, the program execution section 22 restarts the execution of the full mode program AP1 from the state at the time of previous suspension.

The program update section 23 applies the update data UD to the application program AP, to thereby update the application program AP. Specifically, in a case where the user performs an operation of giving an instruction to apply the update data UD (here, operation of tapping the update instruction image Iu) in the state in which the program-related image Ip corresponding to the application program AP is displayed, the program update section 23 applies the update data UD, to thereby update the application program AP. Hereinafter, the application program AP to be subjected to the instruction operation by the user on the update instruction image Iu (in other words, the application program AP corresponding to the program-related image Ip which includes the update instruction image Iu on which the user performs the instruction operation) is referred to as an update target program. In this embodiment, when the user performs the instruction operation on the update instruction image Iu, the program update section 23 first confirms whether or not the update data UD for the update target program exists, and when the update data UD exists, acquires the update data UD. Then, the program update section 23 applies the acquired update data UD to the update target program, to thereby update the update target program.

Figure 6:
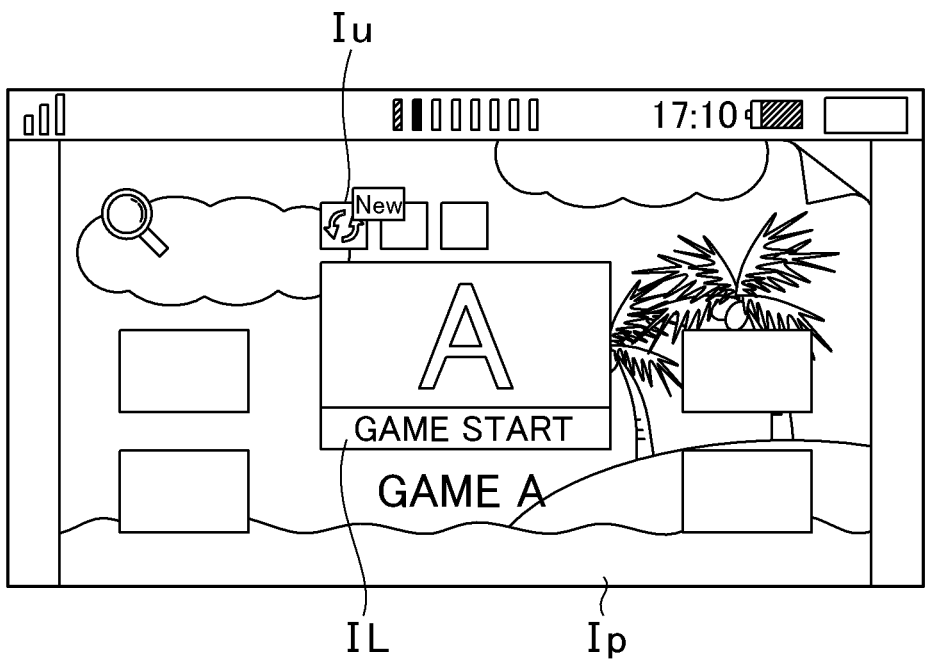
FIG. 6 is a diagram illustrating an example of a screen displaying a program-related image obtained in a state in which update data for an application program has already been acquired.

Note that, when the program update section 23 receives the instruction operation on the update instruction image Iu, the program update section 23 may confirm the existence of the update data UD, acquire the update data UD, and apply the update data UD successively in order. Alternatively, after once confirming the existence of the update data UD and acquiring the update data UD in response to the user's instruction, the program update section 23 may apply the update data UD to the update target program at a timing at which the user further performs again an instruction operation of giving an instruction to apply the update data UD. In this case, the instruction operation of the user giving an instruction to confirm the existence of the update data UD and to acquire the update data UD and the instruction operation of the user giving an instruction to apply the update data UD may be performed on the same update instruction image Iu. In this example, when the program update section 23 receives the instruction operation by the user on the update instruction image Iu, the program update section 23 first confirms whether or not the update data UD has already been acquired, and if the update data UD has not been acquired yet, confirms the existence of the update data UD. On the other hand, if the update data UD has already been acquired, the program update section 23 starts the processing of applying the update data UD. Further, in this example, after the program update section 23 acquires the update data UD in response to the instruction operation by the user on the update instruction image Iu, the update instruction image Iu may be changed in order to indicate the fact that the update data UD that has already been acquired but has not been applied to the application program AP yet exists in the storage unit 12. FIG. 6 is a diagram illustrating an example of the update instruction image Iu obtained after such change, and illustrates a display example of the state after the program update section 23 acquires, in response to the instruction operation by the user on the update instruction image Iu, the update data UD for the application program AP corresponding to the program-related image Ip that is currently displayed in the state in which the program-related image Ip illustrated in FIG. 5 is displayed. In the example of FIG. 6, the update instruction image Iu after the change is an image in which a small icon image is added to the update instruction image Iu before the change. With this, the user can easily understand whether the information processing apparatus 10 has not acquired the update data UD yet or has already acquired the update data UD that has not been applied yet.

Next, description is given of a specific example of the processing in which the program update section 23 confirms whether or not the update data UD exists, and acquires the update data UD. In a state in which the program-related image Ip is displayed on the screen S and the update data UD for the application program AP corresponding to the program-related image Ip is not stored in the storage unit 12, when the user performs an instruction operation on the update instruction image Iu, the program update section 23 makes an inquiry to a predetermined server (hereinafter, referred to as update data providing server) via the communication network, to thereby confirm whether or not the update data UD for the application program AP (update target program) is now provided.

Here, it is assumed that connection destination information (such as IP address) of the update data providing server is stored the storage unit 12 in advance. Note that, the update data providing server may also be a server that is prepared in common for a plurality of kinds of the application programs AP. In this case, the program update section 23 transmits an inquiry to the update data providing server along with identification information (for example, program ID) for identifying the update target program, and the update data providing server confirms whether or not the update data UD exists for the update target program identified by the received identification information, and replies with the result of confirmation. Alternatively, the update data providing server may be prepared independently for each of the plurality of kinds of the application programs AP. In this case, the program update section 23 reads and acquires, from the storage unit 12, the connection destination information of the update data providing server that is prepared for the update target program, and makes an inquiry to the update data providing server identified by the connection destination information as to whether or not the update data exists. The connection destination information may be provided to the information processing apparatus 10 along with, for example, the application program AP itself.

An inquiry made by the program update section 23 to the update data providing server includes version information indicating a version of the update target program that is the subject of the inquiry. The update data providing server refers to the version information included in the inquiry to judge whether or not the version of the update target program existing in the information processing apparatus 10 that has made the inquiry is the same as the version of the update target program obtained after the latest update data UD that is retained by the update data providing server itself is applied, and if it is judged that those versions are not the same, gives a response indicating that the update data UD exists. When receiving the response indicating that the update data UD exists from the update data providing server, the program update section 23 acquires the update data UD retained in the update data providing server by downloading the update data UD.

Next, processing of applying the update data UD is described. In a case where the update data UD acquired from the update data providing server is to substitute a part or whole of files constituting the update target program, the program update section 23 overwrites those files stored in the nonvolatile storage unit 12b by the update data UD, to thereby update the update target program. Alternatively, instead of overwriting the update target program, the update data UD may be stored in a predetermined storage location within the nonvolatile storage unit 12b, and read by the program execution section 22 instead of a part of the update target program. Further, in a case where the update data UD is a file to be newly added as a part of the update target program, the program update section 23 stores the update data UD as the part of the update target program in the predetermined storage location within the nonvolatile storage unit 12b, to thereby update the update target program. Note that, when the update data UD is provided not as an object code that can be executed by the control unit 11 but as a source code described in a programming language, the program update section 23 may execute processing such as compiling on the update data UD, to thereby apply the update data UD to the update target program. Further, when the update data UD is a difference file representing a difference between data before update and data after update, the program update section 23 may modify contents of the files constituting the update target program in accordance with contents of the difference file, to thereby update the update target program.

Here, as described above, the program-related image Ip corresponding to the full mode program AP1 is displayed on the screen S not only before the full mode program AP1 is activated, but also in the state in which the execution of the full mode program AP1 is suspended. Therefore, there may a case where, in the state in which the execution of the full mode program AP1 is suspended, the user taps the update instruction image Iu to give an instruction to apply the update data UD to the full mode program AP1. If the program update section 23 updates the full mode program AP1 as described above while the full mode program AP1 is still in the execution-suspended state, there is a fear that a problem may occur when the suspended processing of the full mode program AP1 is restarted.

Figure 7:
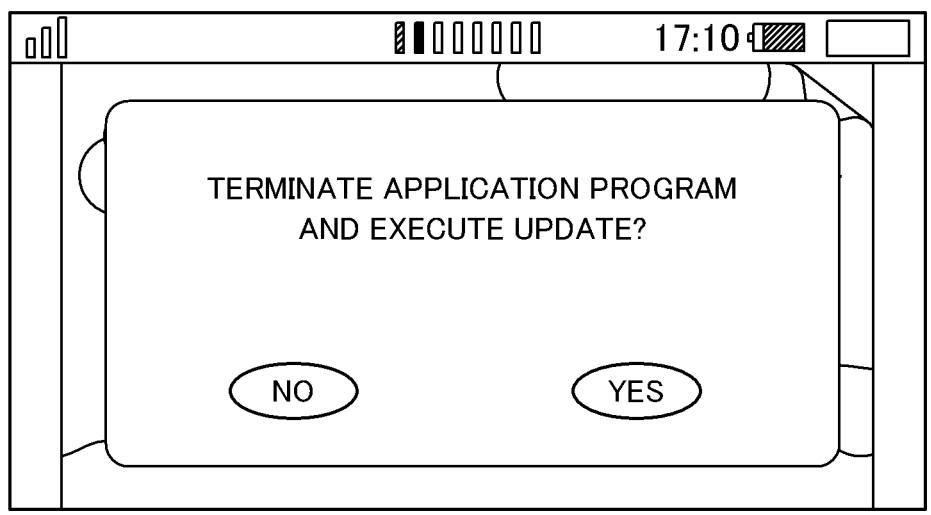
FIG. 7 is a diagram illustrating an example of a screen displaying a message for confirming whether or not the application program can be updated.

In view of the above, when the program update section 23 is to apply the update data UD, the program update section 23 first judges whether or not the full mode program AP1 to be updated by the update data UD is in the execution-suspended state. Specifically, in a case where the program update section 23 has finished acquiring the update data UD from the update data providing server and goes on to start applying the update data UD, or in a case where the program update section 23 receives the instruction operation by the user on the update instruction image Iu and is to apply the update data UD that has already been acquired, the program update section 23 performs such judgment. Then, as a result of the judgment, if the program update section 23 judges that the full mode program AP1 to be updated is in the execution-suspended state, the information processing apparatus 10 outputs to the user a message for confirming whether or not the execution of the full mode program AP1 can be terminated to apply the update data UD. FIG. 7 illustrates a display example obtained in a case where such message for confirming whether or not the full mode program AP1 can be updated is displayed on the screen S. If the user performs an operation of giving an instruction to terminate the execution of the full mode program AP1 in response to the message (in the example of FIG. 7, if "YES" is tapped), the program update section 23 terminates the execution of the full mode program AP1 in the execution-suspended state, for example, to prevent the execution thereof from being restarted, and applies the update data UD. Specifically, for example, the program update section 23 may erase the data at suspension retained in the storage unit 12 to terminate the execution of the full mode program AP1. Alternatively, after receiving the instruction to terminate the execution of the full mode program AP1, the information processing apparatus 10 may prevent the instruction to restart the execution of the full mode program AP1 in the execution-suspended state from being received, to thereby restrict the restart of the execution. On the other hand, if the user performs an operation of giving an instruction not to terminate the execution of the full mode program AP1 (in the example of FIG. 7, if "NO" is tapped), the program update section 23 stops applying the update data UD to the full mode program AP1, and maintains the state in which the execution of the full mode program AP1 is suspended. By executing such confirmation, the information processing apparatus 10 can prevent the update data UD from being applied to the full mode program AP1 in the execution-suspended state against the user's intention.

Note that, in a case where the update target program is the full mode program AP1 in a state before being executed, the program update section 23 only needs to apply the update data UD directly without outputting such a confirmation message as illustrated in FIG. 7. Further, in a case where the update target program is the light program AP2, the program update section 23 may judge whether or not the light program AP2 is being executed, and if the light program AP2 is being executed, may output such a confirmation message as illustrated as an example in FIG. 7, as in the case of the full mode program AP1 described above. Then, depending on the instruction of the user in response to the message, the program update section 23 may decide whether the program update section 23 is to terminate the execution of the light program AP2 that is being executed to apply the update data UD, or is to stop applying the update data UD.

Figure 8A:
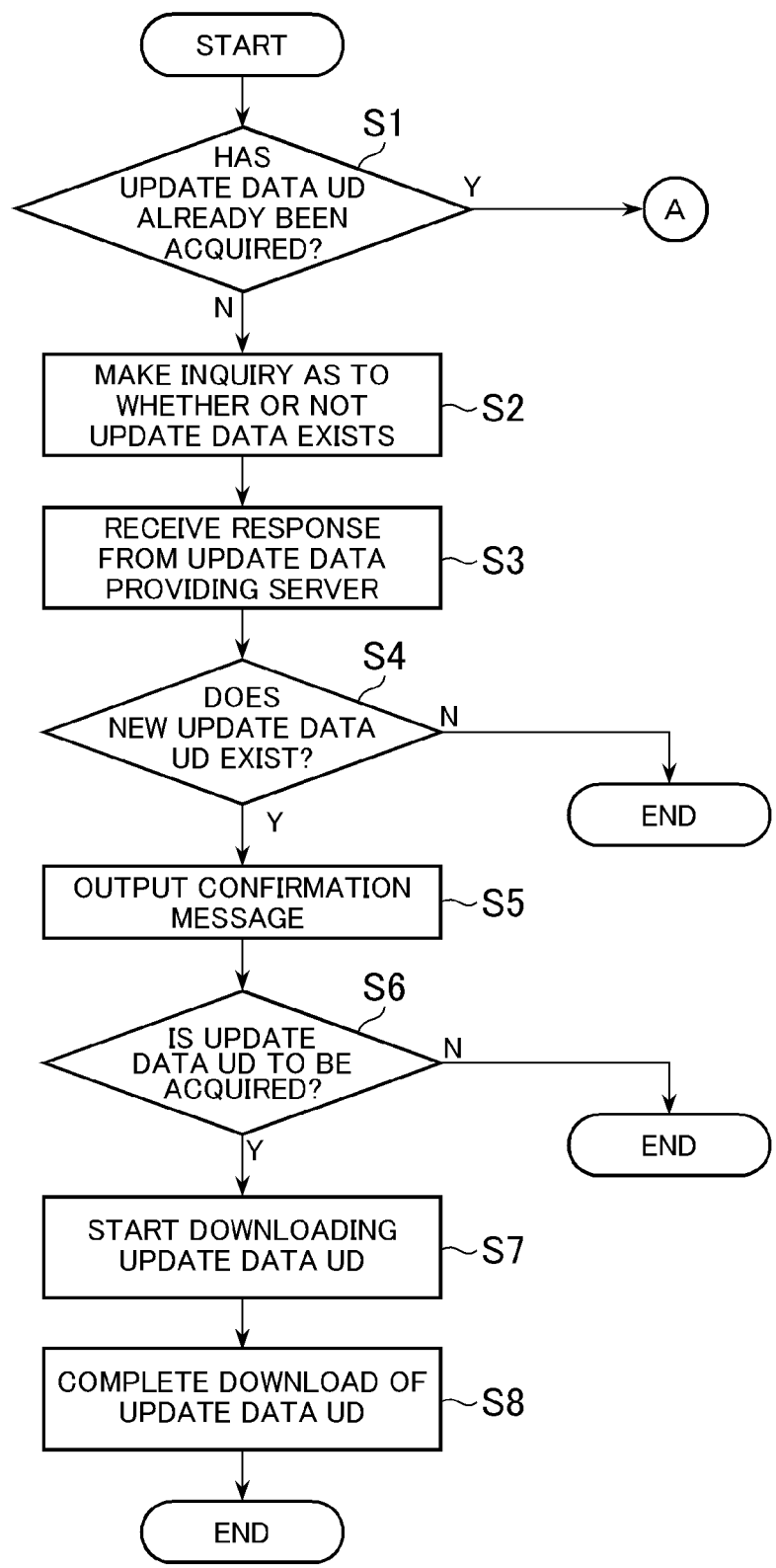
FIG. 8A is a flowchart illustrating an example of a flow of processing executed by the information processing apparatus according to the embodiment of the present invention in a case where a user performs an instruction operation on an update instruction image.
Figure 8B:
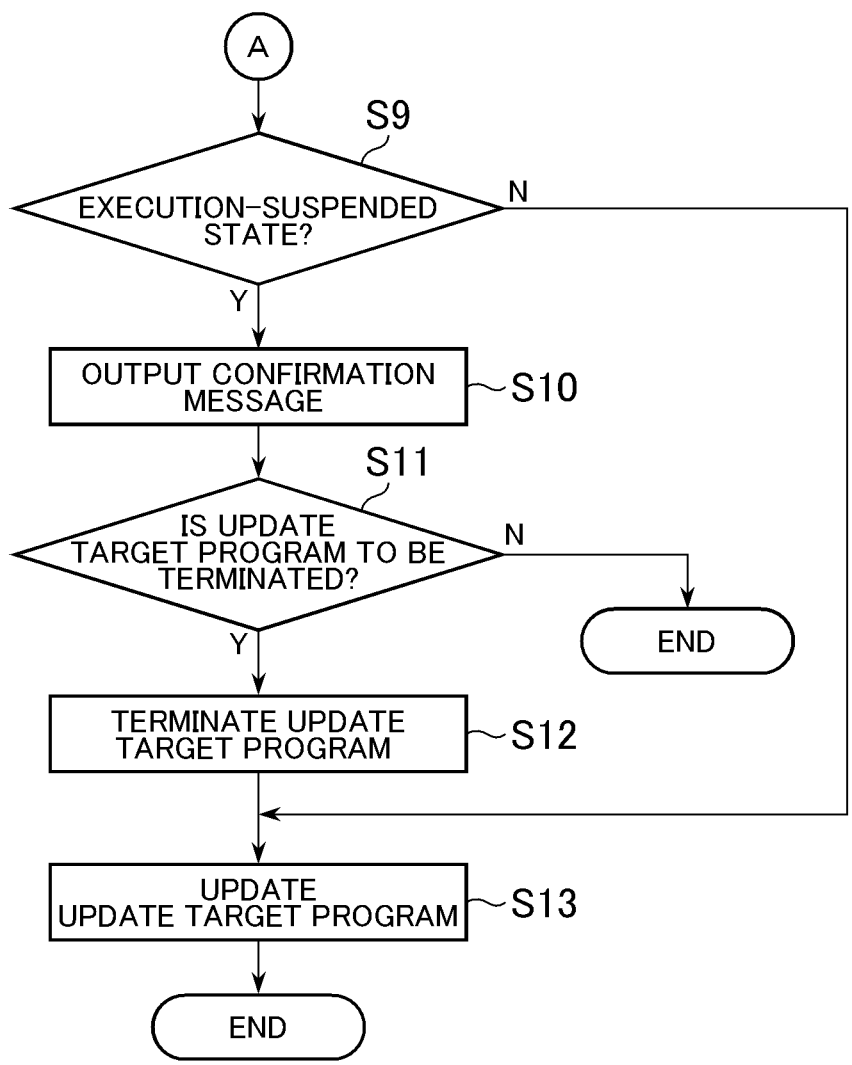
FIG. 8B is a flowchart illustrating the example of the flow of the processing executed by the information processing apparatus according to the embodiment of the present invention in the case where the user performs the instruction operation for the update instruction.

Referring to the flowcharts of FIGS. 8A and 8B, description is now given of a specific example of a flow of processing executed by the program update section 23 of the information processing apparatus 10 in the case where the user performs the instruction operation on the update instruction image Iu.

When receiving the instruction operation on the update instruction image Iu, the program update section 23 first judges whether or not the update data UD for the application program AP that is the subject of the instruction has already been acquired (S1). If the update data UD has not been acquired yet, the program update section 23 makes an inquiry to the update data providing server as to whether or not the update data exists (S2), and then receives a response corresponding to the inquiry from the update data providing server (S3). If it is judged from the response received in S3 that new update data UD is not provided (if the judgment in S4 results in "N"), the program update section 23 displays a message indicating that the application program AP stored in the storage unit 12 is the latest version, and terminates the processing. Note that, at this time, the program update section 23 may make an inquiry to the user as to whether the program update section 23 is to retry, and if the program update section 23 receives from the user an instruction to retry, the program update section 23 may make an inquiry to the update data providing server again.

On the other hand, if it is judged from the response received in S3 that the new update data UD is now provided (if the judgment in S4 results in "Y"), the program update section 23 outputs a message for confirming whether or not to acquire the update data UD (S5). If the user has made a response, to this confirmation message, indicating that the update data UD is not to be acquired (if the judgment in S6 results in "N"), the program update section 23 stops acquiring the update data, and terminates the processing. On the other hand, if the user has made a response for giving an instruction to acquire the update data UD (if the judgment in S6 results in "Y"), the program update section 23 starts downloading the update data UD (S7). Note that, this download may be performed as background processing. This way, even while the program update section 23 is downloading the update data UD from the update data providing server, for example, the user can perform various kinds of instruction operations on the menu image Im or the program-related image Ip displayed on the screen S by the menu image display control section 21, to thereby cause the information processing apparatus 10 to execute another program. Further, in this case, at the time of starting or ending the execution of the download, the program update section 23 may inform the user of that fact by displaying that fact on the screen S by a pop-up display or the like.

When the download started in S7 ends, the program update section 23 stores the downloaded update data UD in the storage unit 12, gives an instruction to change the display of the update instruction image Iu in the program-related image Ip to such display as illustrated as an example in FIG. 6, and completes the acquiring processing for the update data UD (S8).

On the other hand, in the judgment in S1, if it is judged that the update data UD for the application program AP that is the subject of the instruction of the user (update target program) has already been acquired, the program update section 23 judges whether or not the update target program is in the execution-suspended state (S9). If it is judged in S9 that the update target program is in the execution-suspended state, the program update section 23 displays such a confirmation message as illustrated as an example in FIG. 7 on the screen S, and waits for a response from the user (S10). If the user gives, in response to the message in S10, an instruction not to terminate the execution of the update target program (if the judgment in S11 results in "N"), the program update section 23 stops applying the update data UD, and terminates the processing. On the other hand, if the user gives an instruction to terminate the execution of the update target program (if the judgment in S11 results in "Y"), the program update section 23 terminates the processing of the update target program in the execution-suspended state (S12).

If it is judged in S9 that the update target program is not in the execution-suspended state (that is, not executed), and if the processing of the update target program is terminated in S12, the program update section 23 applies the update data UD that has already been acquired to the update target program to thereby update the update target program (S13), and terminates the processing.

Note that, before applying the update data UD to the update target program, the program update section 23 may confirm a version of system software (such as operating system). In this case, the program update section 23 confirms whether or not the system software is updated to the version requested by the application program AP obtained after the update data UD is applied, and if the system software is not updated, acquires and applies the update data for the system software.

Further, in the above description, the update data UD is acquired or applied at the timing at which the user performs the instruction operation on the update instruction image Iu, but the embodiment of the present invention is not limited thereto, and the information processing apparatus 10 according to this embodiment may confirm whether or not the update data UD exists or apply the update data UD that has already been acquired even at a timing at which the application program AP is to be activated.

According to the information processing apparatus 10 of this embodiment described above, the program-related image Ip which relates to the full mode program AP1 is displayed in the state in which the full mode program AP1 is not executed, and hence the information processing apparatus 10 can receive from the user the instruction to apply the update data UD in the state in which the full mode program AP1 is not executed.

Note that, the information processing apparatus according to the embodiment of the present invention is not limited to that described above. For example, the information processing apparatus 10 may include, in place of or in addition to the touch sensor 15 provided so as to overlap the screen S, a touch sensor on the rear surface side of the casing of the information processing apparatus 10 (rear side with respect to the surface on which the screen S is provided). In this case, the touch sensor on the rear surface side also includes a detection surface corresponding to the screen S, and the user can perform the tap operation or the slide operation with respect to the screen S by bringing his/her finger into contact with the touch sensor. Therefore, the information processing apparatus according to the embodiment of the present invention may receive, by an input operation of the user to the touch sensor on the rear surface side, an operation of giving an instruction to execute the application program AP or an operation of giving an instruction to apply the update data UD.

Further, in the above description, the user selects the activation button image IL or the update instruction image Iu by the tap operation on the touch sensor 15, but the present invention is not limited thereto, and the user may perform an operation of selecting the activation button image IL or the update instruction image Iu by, for example, moving a cursor displayed on the screen S by directional keys or the like. Further, the information processing apparatus 10 may receive from the user the operation of giving the instruction to execute the application program AP or the operation of giving the instruction to apply the update data UD by, for example, in place of or in addition to the operation of selecting the activation button image IL or the update instruction image Iu, another operation method such as an operation of pushing a predetermined operation button.

Further, in the above description, the application program AP is stored in the nonvolatile storage unit 12b, and is read from the nonvolatile storage unit 12b into the temporary storage unit 12a at the time of being executed by the control unit 11. However, the present invention is not limited thereto, and the application program AP may be stored in an external storage medium such as optical disc or another communication device connected via the communication network, and may be read into the temporary storage unit 12a at the time of being executed. In this case, the update data UD may be used for overwriting and updating the application program AP stored in the external storage medium, or may be stored in the nonvolatile storage unit 12b separately from the main body of the application program AP and read into the temporary storage unit 12a along with the main body of the application program AP at the time of being executed.

While there have been described what are at present considered to be certain embodiments of the invention, it will be understood that various modifications may be made thereto, and it is intended that the appended claims cover all such modifications as fall within the true spirit and scope of the invention.

What is claimed is:

1. An information processing apparatus, comprising:
a program-related image display control section operating to display, on a screen of a display device, a program-related image which relates to an application program, in a state in which the application program is not executed, where the program-related image includes an execution instruction image to be subjected to the execution instruction operation and an update instruction image to be subjected to the update instruction operation;
a program execution section operating to start execution of the application program in a case where an execution instruction operation of giving an instruction to execute the application program is received from a user in a state in which the program-related image is displayed on the screen, where the execution instruction operation comprises an operation of selecting the execution instruction image by the user; and
a program update section operating to apply update data to the application program to update the application program in a case where an update instruction operation of giving an instruction to apply the update data is received from the user in the state in which the program-related image is displayed on the screen, where the update instruction operation comprises an operation of selecting the update instruction image by the user,
wherein the program update section operates to: (i) acquire the update data when the user selects the update instruction image and the update data has not yet been acquired, and (ii) apply the update data when the user selects the update instruction image and the update data has already been acquired, and
wherein the program-related image display control section operates to change the update instruction image depending on whether or not the update data has been acquired.

2. The information processing apparatus according to claim 1, wherein:
the program-related image display control section displays the program-related image on the screen both in a state before the execution of the application program is started, and in a state in which the execution of the application program is suspended;
the program execution section restarts the execution of the application program which is suspended when: (i) the execution instruction operation is received in a state in which the execution of the application program is suspended, and (ii) the program-related image is displayed on the screen; and
the program update section applies the update data to the application program when: (i) the update instruction operation is received in the state in which the execution of the application program is suspended, (ii) the program-related image is displayed on the screen, and (iii) the execution of the application program which is suspended has been terminated.

3. The information processing apparatus according to claim 2, wherein the program update section is configured to:
output a message for confirming whether or not to terminate the execution of the application program when: (i) the update instruction operation is received in the state in which the execution of the application program is suspended, and (ii) the program-related image is displayed on the screen,
apply the update data to the application program when: (i) the user performs an operation of giving an instruction to terminate the execution of the application program in response to the message, and (ii) the execution of the application program has been terminated, and
stop applying the update data to the application program when: (i) the user performs an operation of giving an instruction not to terminate the execution of the application program in response to the message.

4. An information processing method, comprising:
displaying, on a screen of a display device, a program-related image which relates to an application program, in a state in which the application program is not executed, where the program-related image includes an execution instruction image to be subjected to the execution instruction operation and an update instruction image to be subjected to the update instruction operation;
starting execution of the application program in a case where an execution instruction operation of giving an instruction to execute the application program is received from a user in a state in which the program-related image is displayed on the screen, where the execution instruction operation comprises an operation of selecting the execution instruction image by the user; and
applying update data to the application program to update the application program in a case where an update instruction operation of giving an instruction to apply the update data is received from the user in the state in which the program-related image is displayed on the screen, where the update instruction operation comprises an operation of selecting the update instruction image by the user, wherein the step of applying update data includes: (i) acquiring the update data when the user selects the update instruction image and the update data has not yet been acquired, and (ii) applying the update data when the user selects the update instruction image and the update data has already been acquired, and wherein the step of displaying includes changing the update instruction image depending on whether or not the update data has been acquired.

5. A non-transitory computer-readable information storage medium containing a program including instructions that cause a computer to carry out actions, comprising:

displaying, on a screen of a display device, a program-related image which relates to an application program, in a state in which the application program is not executed, where the program-related image includes an execution instruction image to be subjected to the execution instruction operation and an update instruction image to be subjected to the update instruction operation;

starting execution of the application program in a case where an execution instruction operation of giving an instruction to execute the application program is received from a user in a state in which the program-related image is displayed on the screen, where the execution instruction operation comprises an operation of selecting the execution instruction image by the user; and applying update data to the application program to update the application program in a case where an update instruction operation of giving an instruction to apply the update data is received from the user in the state in which the program-related image is displayed on the screen, where the update instruction operation comprises an operation of selecting the update instruction image by the user, wherein the step of applying update data includes: (i) acquiring the update data when the user selects the update instruction image and the update data has not yet been acquired, and (ii) applying the update data when the user selects the update instruction image and the update data has already been acquired, and wherein the step of displaying includes changing the update instruction image depending on whether or not the update data has been acquired.

6. An information processing apparatus, comprising:

a program-related image display control section operating to display, on a screen of a display device, a program-related image which relates to an application program, both in a state before the execution of the application program is started and in a state in which the execution of the application program is suspended;

a program execution section operating to: (i) start execution of the application program in a case where an execution instruction operation of giving an instruction to execute the application program is received from a user in a state in which the program-related image is displayed on the screen, and (ii) restarts the execution of the application program which is suspended when: (a) the execution instruction operation is received in a state in which the execution of the application program is suspended, and (b) the program-related image is displayed on the screen; and a program update section operating to: (i) apply update data to the application program to update the application program in a case where an update instruction operation of giving an instruction to apply the update data is received from the user in the state in which the program-related image is displayed on the screen, and (ii) apply the update data to the application program when: (a) the update instruction operation is received in the state in which the execution of the application program is suspended, (b) the program-related image is displayed on the screen, and (c) the execution of the application program which is suspended has been terminated.

* * * * *